United States Patent [19]

Watanabe et al.

[11] Patent Number: 4,924,928
[45] Date of Patent: May 15, 1990

[54] PNEUMATIC TIRE

[75] Inventors: Tadashi Watanabe; Yasuyuki Morita, both of Kodaira, Japan

[73] Assignee: Bridgestone Corporation, Tokyo, Japan

[21] Appl. No.: 271,819

[22] Filed: Nov. 16, 1988

[30] Foreign Application Priority Data

Nov. 16, 1987 [JP] Japan .................................. 62-289014

[51] Int. Cl.$^5$ .............................................. B60C 9/20
[52] U.S. Cl. .................................... 152/533; 152/531
[58] Field of Search ............... 152/533, 531, 538, 526, 152/534–536; 156/117

[56] References Cited

U.S. PATENT DOCUMENTS 3,044,522  7/1962  Drakeford et al. ............. 152/533 X
4,146,415  3/1979  Caretta ........................... 152/531 X

FOREIGN PATENT DOCUMENTS 3629955  3/1988  Fed. Rep. of Germany ...... 152/531
51-55505  5/1976  Japan .
55-8966  1/1980  Japan .
58-206401  12/1983  Japan .
60-213505  10/1985  Japan .
61-15604  11/1986  Japan .
62-203803  9/1987  Japan ................................... 152/531

Primary Examiner—Raymond Hoch
Attorney, Agent, or Firm—Sughrue, Mion, Zinn, Macpeak & Seas

[57] ABSTRACT

A pneumatic tire includes a belt layer, a tread arranged radially outwardly of the belt layer, and reinforcing layers arranged between the tread and the belt layer at both ends of its width directions, respectively. Each of the reinforcing layers consists of a belt-like member having a plurality of cords in parallel with each other embedded therein. The belt-like member is spirally wound about the both ends of the belt layer from inside to outside of a width direction of the belt layer. A terminal portion of the belt-like member is bent inwardly in the width direction of the belt layer to overlap at least one of cords of the terminal portion and at least one of cords of the belt-like member adjacent thereto, thereby preventing the terminal portions of the belt-like members from being dislodged from the tread and deformed and cords of the terminal portions from separating from the tread even after being used for a long period of time.

5 Claims, 2 Drawing Sheets

PNEUMATIC TIRE

BACKGROUND OF THE INVENTION

This invention relates to a pneumatic tire including a belt layer, a tread arranged radially outwardly of the belt layer, and reinforcing layers arranged between the tread and the belt layer at both ends of its width directions, respectively.

A pneumatic tire has been proposed which includes a belt layer, a tread arranged radially outwardly of the belt layer, and reinforcing layers arranged between the tread and the belt layer at both ends of its width directions, respectively, and each of the reinforcing layers is formed by a belt-like member. The belt-like member includes a plurality of parallel cords embedded therein and is spirally wound from inside to outside of the width direction so that edge of the belt-like member are in intimate contact with each other. Such a pneumatic tire is preferable for vehicles running at high speeds, because of the reinforcing layers restraining both the ends of the belt layer of the width directions by a hoop effect.

With such a pneumatic tire, however, the terminal ends of the belt-like members are attached to the tread and adjacent side edges of the belt-like members only by binding force. Therefore, when a band material consisting of a tread, reinforcing layers and a belt layer is grasped from its outside to be transferred to a second building machine, there is a risk of the terminal portions of the belt-like members being dislodged from the tread or the like or deformed due to vibration or the like. Moreover, as the terminal portions of the belt-like members are only attached to the tread or the like, cut surfaces of cords exposed at terminal ends of the belt-like members are difficult to be covered by rubber even in vulcanizing. Further, as the terminal portions of the belt-like members are free ends, they may deform more readily than other portions of the belt-like members when the tread of the tire in running is contacting a road. As a result, the cords at the terminal portions of the belt-like members are often separated from the rubber after running for a long period of time, whereby the performance of the tire is lowered.

SUMMARY OF THE INVENTION

It is an object of the invention to provide an improved pneumatic tire which eliminates all the disadvantages of the prior art and whose terminal portions of belt-like members are not dislodged from a tread or deformed even if subjected to vibrations or the like and whose cords at the terminal portion are not separated from rubber even after running for a long period of time.

In order to achieve this object, in a pneumatic tire including a belt layer, a tread arranged radially outwardly of the belt layer, and reinforcing layers arranged between the tread and the belt layer at both ends of its width directions, respectively, each of the reinforcing layers consisting of a belt-like member having a plurality of cords in parallel with each other embedded therein, and said belt-like member being spirally wound about said both ends of the belt layer from inside to outside of a width direction of the belt layer. According to the invention a terminal portion of each of the belt-like members is bent inwardly in the width direction of the belt layer to overlap at least one of cords of the terminal portion and at least one of cords of the belt-like member adjacent thereto.

According to the invention, the terminal portion of each belt-like member is bent inwardly in a width direction of the tire to overlap at least one of the cords of the terminal portion and at least one of the cords of the adjacent belt-like member. Therefore, the terminal end of the belt-like member is embraced between the tread and the adjacent belt-like member to be strongly restrained. As a result, even if a band material consisting of a belt layer, reinforcing layers and a tread is subjected to vibration or the like in transferring the band material, the terminal portions of the belt-like members of the reinforcing layers are not deformed or dislodged from the tread or the like. Moreover, since the terminal end of each belt-like member is embedded in the tread, the terminal end surfaces of the belt-like member or cut surfaces of cords exposed thereat are easily covered by flowing rubber of the tread when vulcanizing. Further, the tire is completed, the terminal portions of the belt-like members are embraced and strongly restrained between the tread and the adjacent belt-like members. Therefore, the terminal portions deform only to the same extent as remaining parts of the belt-like members. As a result, the cords at the terminal portions of the belt-like members do not separate from the rubber, even after the tire has run for a long period of time.

In order that the invention may be more clearly understood, preferred embodiments will be described, by way of example, with reference to the accompanying drawings.

DESCRIPTION OF THE PREFERRED EMBODIMENT

Figure 1:
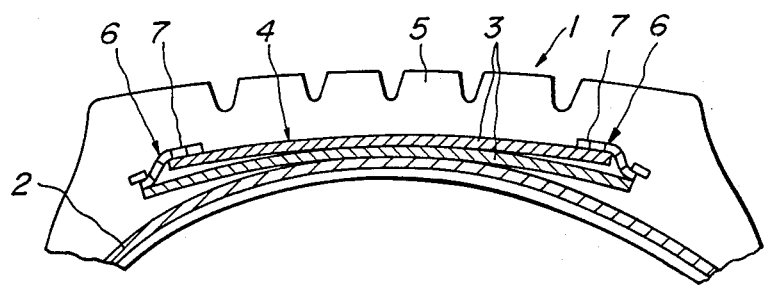
FIG. 1 is a sectional view of a pneumatic tire illustrating one embodiment of the invention taken along an equatorial plane of the tire.
Figure 2:
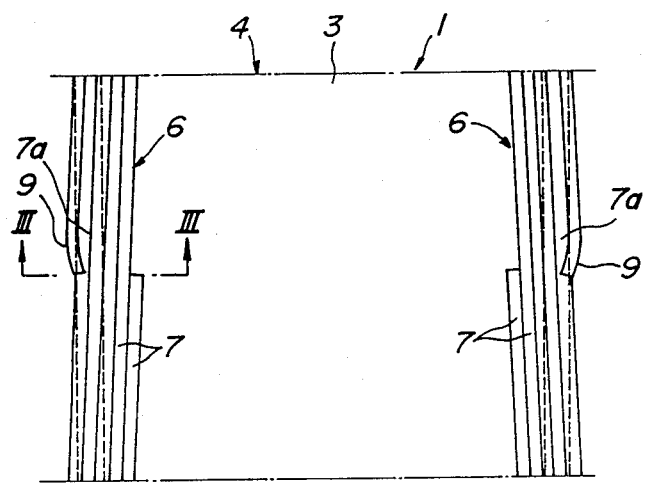
FIG. 2 is a development view of the belt layer and reinforcing layers shown in FIG. 1.

Referring to FIGS. 1 and 2, a pneumatic radial tire 1 comprises a toroidal carcass layer 2, a belt layer 4 consisting of a plurality of belt plies 3 arranged radially outwardly of the carcass layer 2 and a tread 5 arranged radially outwardly of the belt layer 4. Reinforcing layers 6 are arranged between the tread 5 and the belt layer 4 at both ends of its width direction, respectively. Each of the reinforcing layers 6 is formed by spirally winding a belt-like member 7 from an inside to an outside of the width direction so that edges of the belt-like member 7 are in intimate contact with each other as shown in FIG. 2.

Figure 3:
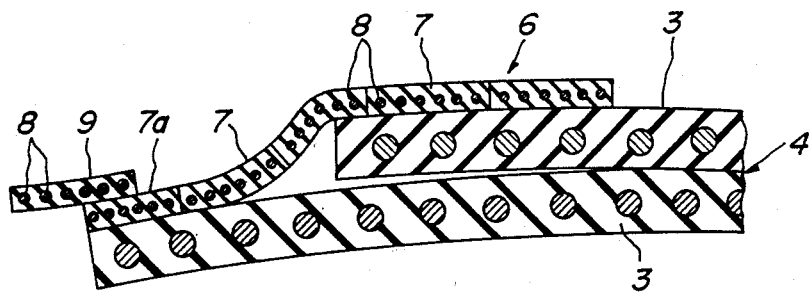
FIG. 3 is a sectional view of the belt layer and the reinforcing layer taken along the line III—III in FIG. 2.

As shown in FIG. 3, the belt-like member 7 includes a plurality of steel cords 8 embedded therein and extending in longitudinal directions in parallel with each other. As a result, both the ends of the belt layer 4 are rigidly restrained radially inwardly by the reinforcing layers 6. A terminal portion 9 of each belt-like member 7 is forcedly bent inwardly in the width direction. Therefore, at least one cord 8 of the terminal portion 9 overlaps at least one cord 8 of the belt-like member 7a inwardly adjacent to terminal portion 9 at the terminal end of the member 7. The greater the number of the overlapping cords, the better the member 7 is for its purpose. It is preferable that the terminal end of the belt-like member 7 completely overlaps the member 7a inwardly adjacent thereto so that all the cords in the terminal end overlap those in the member 7a.

As above described, according to the invention, the terminal portion 9 of each belt-like member 7 is deformed inwardly in the width direction so that at least one cord 8 in the terminal end 9 overlaps at least one cord 8 in the adjacent belt-like member 7a. Therefore, the terminal portion 9 of each of the belt-like members 7 is embraced between the tread 5 and the adjacent belt-like member 7a to be strongly restrained. As a result, for example, when a belt-like member consisting of a belt layer 4, a tread 5 and reinforcing layers 6 is grasped from outside and transferred to a second building machine, the terminal portion 9 of each of the belt-like members 7 is not deformed or dislodged from the tread or the like, even if the belt-like material is subjected to vibration or the like.

With the above arrangement of the reinforcing layers 7, moreover, the terminal end of each of the belt-like members 7 is forced into the tread 5, with the result that during vulcanizing, a rubber of the tread flows to cover a surface of the terminal end of the belt-like member 7 or cut surfaces of exposed cords 8 easily. Moreover, after the tire is completed, the terminal portion 9 of each of the belt-like members 7 is embraced between the tread 5 and the adjacent belt-like member 7a to be strongly restrained as above described. Therefore, the terminal portions 9 only deform to substantially the same extent as remaining portions of the belt-like members 7 do when running. Accordingly, the cords 8 of the terminal portions of the belt-like member 7 do not separate from the rubber even after the tire has run for a long period of time.

Figure 4:
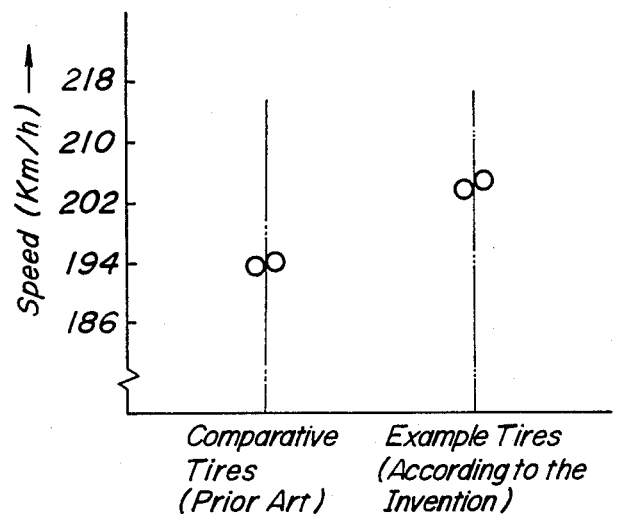
FIG. 4 is a graph illustrating results of comparative tests of tires according to the invention and of the prior art.

FIG. 4 illustrates a graph for explaining results of a test of the present invention. The inventors prepared examples of tires according to the invention and comparative tires explained in the preamble of this specification and carried out a performance test at high rotating speeds with drums according to the American Federal Motor Vehicle Safety Standard. As can be seen from the graph of FIG. 4, cords are prevented from separating from rubber by applying the present invention, thereby improving the high speed traveling performance.

As above described, according to the invention each of terminal portions of the belt-like member is embraced between the tread and the adjacent belt-like member so that the terminal portion is prevented from being dislodged from the tread and being deformed even if being subjected to vibration or the like. Moreover, cut surfaces of cords exposed at terminal surfaces of the belt-like members are easily covered by rubber of the tread when vulcanizing, and terminal portions of the belt-like members are restrained by the tread and the adjacent belt-like members so that the cords of the terminal portions of the belt-like members are not separated from the rubber of the tread.

It is further understood by those skilled in the art that the foregoing description is that of preferred embodiments of the disclosed tires and that various changes and modifications may be made in the invention without departing from the spirit and scope thereof.

What is claimed is:

1. A pneumatic tire including a belt layer, a tread arranged radially outwardly of the belt layer, and reinforcing layers arranged between the tread and the belt layer at each lateral end of the belt layer, respectively, each of the reinforcing layers consisting of a vulcanizable member having a plurality of embedded cords in parallel with each other, and said vulcanizable member being spirally wound about said both lateral ends of the belt layer from inside to outside in a width wise direction of the belt layer, wherein an axially outer disposed terminal portion of each of the vulcanizable members is bent inwardly in the width wise direction of the belt layer to overlap at least one of cords of the axially outer disposed terminal portion and at least one of cords of the vulcanizable member adjacent thereto.

2. The tire of claim 1 wherein said belt layer comprises a pair of belt plies.

3. The tire of claim 1 wherein said embedded cords comprise steel cords.

4. The tire of claim 2 wherein each of said vulcanizable members is spirally wound to cover the lateral ends of each of said belt plies.

5. The tire of claim 4 wherein each axially outer disposed terminal portion is covered by tread rubber.

* * * * *